Patented Aug. 7, 1934

1,968,841

UNITED STATES PATENT OFFICE 1,968,841

FLUX FOR SILVER-SOLDERING STAINLESS STEEL

Anthony J. Maffia, Brooklyn, N. Y.

No Drawing. Application December 15, 1931, Serial No. 581,263

4 Claims. (Cl. 148—26)

(Granted under the act of March 3, 1883, as amended April 30, 1928; 370 O. G. 757)

This invention relates to a compound for silver-soldering metal pieces to stainless steel.

It is the object of my invention to provide a compound of the kind mentioned that will be an efficient medium for effecting the bonding of metal members with stainless steel without the necessity of cleaning the surfaces that are to be united.

One particular use to which the present invention has been applied is soldering the binding wire to stainless steel blading of turbines, though it is to be understood that the utility of my invention is by no means limited thereto.

Before using any of the previously known fluxes with which I am familiar, it is necessary to clean thoroughly the surfaces of the metal to be soldered, as by polishing with emery cloth and then washing with alcohol. As this must be done by hand it entails a considerable expense for labor and requires much more time for any given job than is involved in the use of my flux, since it is not necessary when using the flux developed by me to clean the surfaces before soldering therewith.

The flux preferably has substantially the following composition, by measure: boric acid, three parts; powdered borax, two parts; and powdered ammonium chloride, one and one-half parts, with sufficient hydrogen peroxide to make a thick paste. This should be mixed in a dark glass jar to prevent decomposition of the hydrogen peroxide by the action of light.

My flux may also be made of substantially equal parts by measure of powdered borax, powdered ammonium chloride, and powdered boric acid mixed with water to make a thick paste. The stated proportions may, in some cases, be varied within moderate limits. All lumps should be pulverized and the ingredients intimately mixed. The suitable specified liquid is then added in quantity to make a thick paste when thoroughly stirred, and the flux is ready for use. In case the paste dries, it is necessary merely to add liquid to restore the desired consistency.

It will be understood that the above description comprehends only the general and preferred embodiment of my invention, and that various changes therein may be made within the scope of the appended claims without sacrificing any of the advantages of my invention.

The herein described invention may be manufactured and used by or for the Government of the United States for governmental purposes without the payment to me of any royalties thereon.

Having thus described my invention, what I claim is:

1. A soldering flux composed of substantially equal parts of borax, ammonium chloride and boric acid, together with water to make a thick paste.

2. A soldering flux composed of boric acid, three parts; borax, two parts; ammonium chloride one and one-half parts, and sufficient hydrogen peroxide to make a thick paste.

3. A soldering flux composed of boric acid, borax and ammonium chloride substantially in the proportions of three parts, two parts and one and one-half parts, respectively, and water to make a paste.

4. A soldering flux composed of the hereinafter named substances substantially in the proportions mentioned: boric acid, three parts; borax, two to three parts; and ammonium chloride, one and one-half to three parts, together with a liquid from the group consisting of water and hydrogen peroxide, in quantity to make a thick paste.

ANTHONY J. MAFFIA.